United States Patent
Nakagawa et al.

(10) Patent No.: US 10,995,385 B2
(45) Date of Patent: May 4, 2021

(54) HOT PRESSED PART AND METHOD OF MANUFACTURING SAME

(71) Applicant: JFE STEEL CORPORATION, Tokyo (JP)

(72) Inventors: Koichi Nakagawa, Tokyo (JP); Yoshikiyo Tamai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 98 days.

(21) Appl. No.: 16/482,154

(22) PCT Filed: Feb. 5, 2018

(86) PCT No.: PCT/JP2018/003811
§ 371 (c)(1),
(2) Date: Jul. 30, 2019

(87) PCT Pub. No.: WO2018/179839
PCT Pub. Date: Oct. 4, 2018

(65) Prior Publication Data
US 2019/0390295 A1     Dec. 26, 2019

(30) Foreign Application Priority Data
Mar. 30, 2017  (JP) .............................. JP2017-068103

(51) Int. Cl.
*B32B 15/01*     (2006.01)
*C22C 18/00*    (2006.01)
(Continued)

(52) U.S. Cl.
CPC ............. *C21D 9/46* (2013.01); *B21D 22/022* (2013.01); *B32B 15/012* (2013.01);
(Continued)

(58) Field of Classification Search
CPC ....... Y10T 428/24942; Y10T 428/2495; Y10T 428/26; Y10T 428/12757;
(Continued)

(56) References Cited

U.S. PATENT DOCUMENTS 8,951,367 B2    2/2015  Kawamura et al.
9,409,221 B2    8/2016  Kobayashi
(Continued)

FOREIGN PATENT DOCUMENTS

JP    2006104546 A    4/2006
JP    2011179030 A    9/2011
(Continued)

OTHER PUBLICATIONS

Dec. 16, 2019, the Extended European Search Report issued by the European Patent Office in the corresponding European Patent Application No. 18776054.1.
(Continued)

*Primary Examiner* — Michael E. La Villa
(74) *Attorney, Agent, or Firm* — Kenja IP Law PC

(57) ABSTRACT

A hot pressed part comprises: a predetermined chemical composition; and a steel microstructure that is a gradient microstructure in which, in a thickness direction, a surface layer is a soft layer, an inside is a hard layer, and a layer between the soft layer and the hard layer is a transition layer.

16 Claims, 1 Drawing Sheet

(51) Int. Cl.

| | | |
|---|---|---|
| C22C 38/06 | (2006.01) | |
| C22C 38/04 | (2006.01) | |
| C22C 38/02 | (2006.01) | |
| C22C 38/00 | (2006.01) | |
| B21D 22/02 | (2006.01) | |
| C21D 6/00 | (2006.01) | |
| C21D 8/02 | (2006.01) | |
| C21D 9/46 | (2006.01) | |
| C21D 1/18 | (2006.01) | |
| C23C 2/02 | (2006.01) | |
| C21D 3/04 | (2006.01) | |
| C21D 8/04 | (2006.01) | |
| C22C 38/08 | (2006.01) | |
| C22C 38/18 | (2006.01) | |
| C22C 38/28 | (2006.01) | |
| C22C 38/16 | (2006.01) | |
| C22C 38/32 | (2006.01) | |
| C21D 9/48 | (2006.01) | |
| C22C 38/12 | (2006.01) | |
| C22C 38/14 | (2006.01) | |
| C23C 2/06 | (2006.01) | |
| C21D 9/00 | (2006.01) | |
| C21D 1/673 | (2006.01) | |
| C21D 1/74 | (2006.01) | |
| B32B 15/04 | (2006.01) | |
| C23C 2/26 | (2006.01) | |
| C23C 28/02 | (2006.01) | |
| C23C 30/00 | (2006.01) | |
| B32B 15/18 | (2006.01) | |
| C23C 2/12 | (2006.01) | |
| C23C 2/40 | (2006.01) | |
| C22C 38/50 | (2006.01) | |
| C22C 38/40 | (2006.01) | |
| C22C 38/38 | (2006.01) | |
| C22C 38/44 | (2006.01) | |
| C22C 38/42 | (2006.01) | |
| C22C 38/54 | (2006.01) | |
| C22C 38/22 | (2006.01) | |
| C22C 38/46 | (2006.01) | |
| C22C 38/24 | (2006.01) | |
| C22C 38/26 | (2006.01) | |
| C22C 38/20 | (2006.01) | |
| C22C 38/48 | (2006.01) | |
| C22C 38/34 | (2006.01) | |

(52) U.S. Cl.
CPC ............ *B32B 15/013* (2013.01); *B32B 15/04* (2013.01); *B32B 15/043* (2013.01); *B32B 15/18* (2013.01); *C21D 1/18* (2013.01); *C21D 1/673* (2013.01); *C21D 1/74* (2013.01); *C21D 3/04* (2013.01); *C21D 6/005* (2013.01); *C21D 6/008* (2013.01); *C21D 8/0205* (2013.01); *C21D 8/0236* (2013.01); *C21D 8/0247* (2013.01); *C21D 8/0457* (2013.01); *C21D 8/0473* (2013.01); *C21D 9/0068* (2013.01); *C21D 9/48* (2013.01); *C22C 18/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C23C 2/02* (2013.01); *C23C 2/06* (2013.01); *C23C 2/12* (2013.01); *C23C 2/26* (2013.01); *C23C 2/40* (2013.01); *C23C 28/02* (2013.01); *C23C 28/021* (2013.01); *C23C 28/023* (2013.01); *C23C 28/025* (2013.01); *C23C 30/00* (2013.01); *C23C 30/005* (2013.01); *C21D 2211/005* (2013.01); *C21D 2211/008* (2013.01); *Y10T 428/12757* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/2495* (2015.01); *Y10T 428/24942* (2015.01); *Y10T 428/26* (2015.01)

(58) Field of Classification Search
CPC ..... Y10T 428/12799; Y10T 428/12951; Y10T 428/12958; Y10T 428/12972; Y10T 428/12979; Y10T 428/12965; C23C 2/02; C23C 2/06; C23C 2/12; C23C 2/26; C23C 2/40; C23C 28/02; C23C 28/021; C23C 28/023; C23C 28/025; C23C 30/00; C23C 30/005; C22C 38/001; C22C 38/002; C22C 38/02; C22C 38/04; C22C 38/06; C22C 38/28; C22C 38/32; C22C 38/005; C22C 38/08; C22C 38/16; C22C 38/18; C22C 38/12; C22C 38/14; C22C 38/20; C22C 38/22; C22C 38/24; C22C 38/26; C22C 38/34; C22C 38/38; C22C 38/40; C22C 38/42; C22C 38/44; C22C 38/46; C22C 38/48; C22C 38/50; C22C 38/54; C22C 18/00; B32B 15/012; B32B 15/013; B32B 15/04; B32B 15/043; B32B 15/18; B21D 22/022; C21D 3/04; C21D 1/18; C21D 1/673; C21D 1/74; C21D 9/46; C21D 9/48; C21D 9/0068; C21D 6/005; C21D 6/008; C21D 6/0205; C21D 6/0236; C21D 6/0247; C21D 2211/005; C21D 2211/008; C21D 8/0457; C21D 8/0473

See application file for complete search history.

(56) References Cited

U.S. PATENT DOCUMENTS

| | | | |
|---|---|---|---|
| 10,253,387 | B2 | 4/2019 | Hayashi et al. |
| 10,273,555 | B2 | 4/2019 | Hayashi |
| 2016/0017452 | A1 | 1/2016 | Puerta Velasquez et al. |
| 2016/0362763 | A1 | 12/2016 | Oh et al. |
| 2017/0029915 | A1 | 2/2017 | Hayashi |
| 2017/0306437 | A1 | 10/2017 | Nakagawa et al. |
| 2018/0237877 | A1* | 8/2018 | Wang .................. C21D 9/0068 |
| 2019/0010587 | A1 | 1/2019 | Murakami et al. |

FOREIGN PATENT DOCUMENTS

| | | |
|---|---|---|
| JP | 2011224646 A | 11/2011 |
| JP | 2016108644 A | 6/2016 |
| WO | 2014166630 A1 | 10/2014 |
| WO | 2015097882 A1 | 7/2015 |

(56) References Cited

FOREIGN PATENT DOCUMENTS

| WO | 2015097891 A1 | 7/2015 |
| WO | 2016063467 A1 | 4/2016 |

OTHER PUBLICATIONS

Won Seok Choi et al, Characterization of the Bendability of Press-Hardened 22MnB5 Steel, steel research international, 2014, pp. 824-835, vol. 85, No. 5.

May 1, 2018, International Search Report issued in the International Patent Application No. PCT/JP2018/003811.

\* cited by examiner

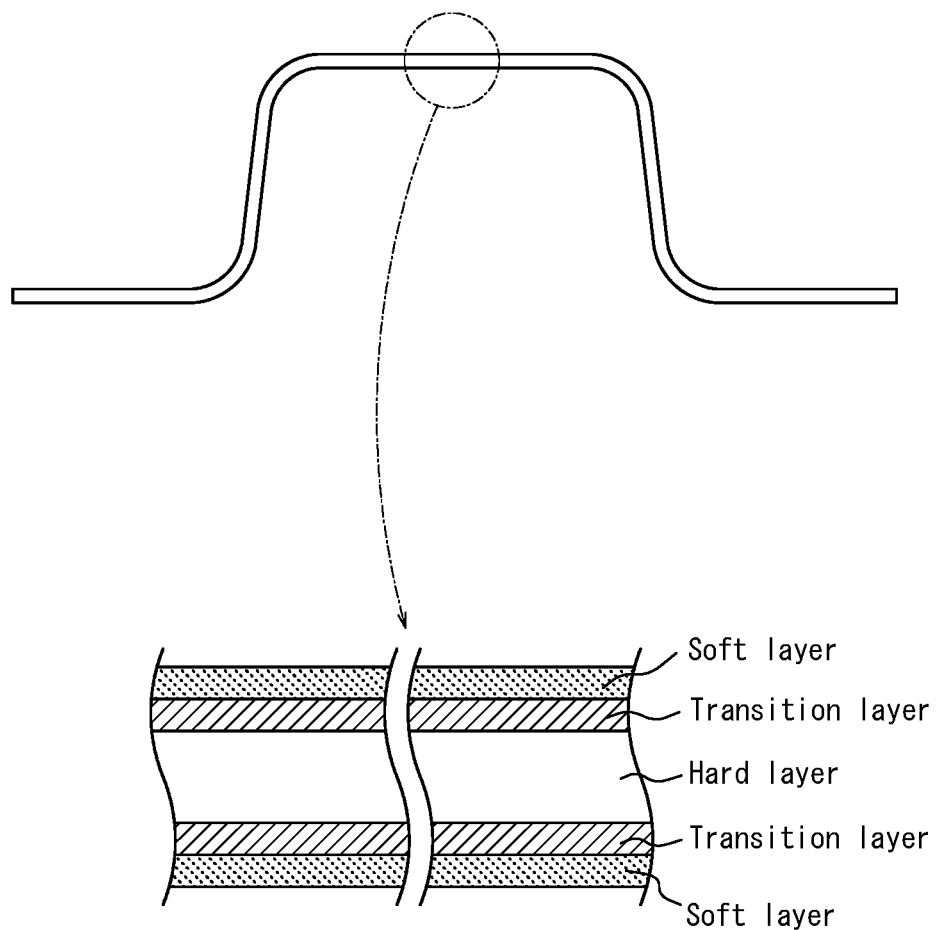

HOT PRESSED PART AND METHOD OF MANUFACTURING SAME

TECHNICAL FIELD

The present disclosure relates to a hot pressed part obtained by hot pressing a steel sheet. The present disclosure particularly relates to a hot pressed part that has a gradient microstructure, i.e. a microstructure changing in the thickness direction, and has both high strength and high bendability.

BACKGROUND

Recent years have seen demand to improve the fuel efficiency of automobiles, for global environment protection. This has led to need for weight reduction of automotive bodies. To meet the need, steel sheets as blank sheets of automotive parts are required to have high strength so that safety will not be undermined even with thinner automotive parts.

Meanwhile, increasing the bendability of automotive parts is effective in enhancing the ability to absorb energy upon crash of automobiles (crash energy absorbing performance). There has thus been strong demand for automotive parts having excellent bendability as well as high strength.

To meet this demand, for example, JP 2011-179030 A (PTL 1) discloses an "ultra high strength cold-rolled steel sheet with excellent bendability that contains, in mass %, C: 0.15% to 0.30%, Si: 0.01% to 1.8%, Mn: 1.5% to 3.0%, P: 0.05% or less, S: 0.005% or less, Al: 0.005% to 0.05%, and N: 0.005% or less with a balance consisting of Fe and inevitable impurities, and has a steel sheet surface layer soft portion satisfying the following (1) and (2):

$$Hv(S)/Hv(C) \leq 0.8 \quad (1)$$

(Hv(S): hardness of steel sheet surface layer soft portion, Hv(C): hardness of steel sheet central portion)

$$0.10 \leq t(S)/t \leq 0.30 \quad (2)$$

(t(S): thickness of steel sheet surface layer soft portion, t: sheet thickness), wherein the steel sheet surface layer soft portion includes tempered martensite of 90% or more in volume fraction, a microstructure of the steel sheet central portion is tempered martensite, and tensile strength is 1270 MPa or more".

However, strengthening a steel sheet typically causes lower formability. Hence, in the case of manufacturing an automotive part by cold forming using the steel sheet disclosed in PTL 1 as a blank sheet, problems such as difficulty in forming and degraded shape fixability arise. In particular, because springback occurs after forming, desired part shape accuracy cannot be achieved.

In view of such problems, a technique of manufacturing a high strength automotive part by applying a hot press process to a steel sheet has been proposed.

In the hot press process, after heating a steel sheet to an austenite region, the steel sheet is conveyed to a press machine and, in the press machine, the steel sheet is formed into a part of a desired shape in a tool of press forming, and simultaneously rapid-cooled. In the cooling (rapid cooling) process in the tool of press forming, the microstructure of the part undergoes phase transformation from austenite phase to martensite phase. A high strength part of a desired shape is thus obtained.

As an automotive part yielded by such a hot press process, for example, JP 2006-104546 A (PTL 2) discloses a "high strength automotive part wherein a thickness of a surface layer is 1 nm to 300 μm, a dislocation density of the surface layer is less than or equal to $1/100$ of a dislocation density of inner layer steel, the inner layer steel has a chemical composition containing, in mass %, C: 0.1% to 0.8% and Mn: 0.5% to 3%, and a tensile strength is 980 N/mm² or more".

CITATION LIST

Patent Literatures

PTL 1: JP 2011-179030 A
PTL 2: JP 2006-104546 A

SUMMARY

Technical Problem

The automotive part in PTL 2, however, has a problem in that sufficient bendability cannot be achieved.

It could therefore be helpful to provide a hot pressed part having both high strength of 1100 MPa or more in tensile strength (TS) and high bendability of 70 degrees or more in bending angle, and an advantageous method of manufacturing the same.

The term "bending angle" herein denotes bending angle α measured by a bend test according to German Automotive Industry (VDA: Verband der Deutschen Automobil-Industrie) standard: VDA238-100.

Solution to Problem

As a result of conducting extensive studies to achieve not only high strength but also high bendability in a hot pressed part, we discovered the following:

(A) To achieve both high strength and high bendability which are mutually contradictory properties, it is important to form the steel microstructure of the hot pressed part as a gradient microstructure that changes in the thickness direction, that is, a gradient microstructure made up of a hard layer contributing to strength, a soft layer contributing to bendability, and a transition layer between the hard layer and the soft layer in the thickness direction, and appropriately control the microstructure and thickness of each layer.

(B) To obtain this gradient microstructure, it is important to appropriately adjust the manufacturing conditions of a blank steel sheet (hereafter also referred to as a "steel sheet for hot press") for the hot pressed part, in particular, the dew point, the annealing temperature, and the annealing time in annealing after cold rolling, and appropriately adjust the forming start temperature in press forming.

The present disclosure is based on these discoveries and further studies.

We thus provide:

1. A hot pressed part comprising:
a chemical composition containing (consisting of), in mass %,
C: 0.18% to 0.40%,
Si: 0.01% to 2.0%,
Mn: 0.5% to 2.5%,
P: 0.05% or less,
S: 0.05% or less,
Al: 0.005% to 0.1%, and
N: 0.01% or less,
with a balance consisting of Fe and inevitable impurities; and a steel microstructure in which, in a thickness direction of the hot pressed part, a surface layer is a soft layer, an inside is a hard layer, and a layer between the soft layer and the hard layer is a transition layer, wherein the soft layer includes ferrite of 90% or more in volume fraction with respect to the whole soft layer, an average grain size of the ferrite is 2 μm or more and 50 μm or less, and a total thickness of the soft layer is 5% or more and 25% or less of a thickness of the hot pressed part, a total thickness of the transition layer is 5% or more and 25% or less of the thickness of the hot pressed part, and the hard layer includes martensite of 90% or more in volume fraction with respect to the whole hard layer.

2. The hot pressed part according to 1., wherein the chemical composition further contains, in mass %, one or more groups selected from A group: one or more selected from Ni: 0.01% to 5.0%, Cu: 0.01% to 5.0%, Cr: 0.01% to 5.0%, and Mo: 0.01% to 3.0%, B group: one or more selected from Ti: 0.005% to 3.0%, Nb: 0.005% to 3.0%, V: 0.005% to 3.0%, and W: 0.005% to 3.0%, C group: one or more selected from REM: 0.0005% to 0.01%, Ca: 0.0005% to 0.01%, and Mg: 0.0005% to 0.01%, D group: Sb: 0.002% to 0.03%, and E group: B: 0.0005% to 0.05%.

3. The hot pressed part according to 1. or 2., comprising a coating layer on a surface thereof.

4. The hot pressed part according to 3., wherein the coating layer is a zinc-based coating layer or an aluminum-based coating layer.

5. The hot pressed part according to 4., wherein the zinc-based coating layer contains Ni: 10 mass % to 25 mass %.

6. A method of manufacturing a hot pressed part, the method comprising:

heating a slab and hot rolling the slab to obtain a hot-rolled steel sheet, the slab having a chemical composition containing, in mass %, C: 0.18% to 0.40%,
Si: 0.01% to 2.0%,
Mn: 0.5% to 2.5%,
P: 0.05% or less,
S: 0.05% or less,
Al: 0.005% to 0.1%, and
N: 0.01% or less, with a balance consisting of Fe and inevitable impurities;

cold rolling the hot-rolled steel sheet to obtain a cold-rolled steel sheet;

heating the cold-rolled steel sheet to a temperature range of $Ac_1$-50° C. or more and less than $Ac_3$ point in an atmosphere of a dew point of 50° C. or more and 90° C. or less, thereafter retaining the cold-rolled steel sheet in the atmosphere and in the temperature range for 5 min or more and 90 min or less, and thereafter cooling the cold-rolled steel sheet, to obtain a steel sheet for hot press; and heating the steel sheet for hot press to a temperature range of $Ac_3$ point or more and 1000° C. or less, retaining the steel sheet for hot press in the temperature range for 10 sec or more and 900 sec or less, and thereafter press forming and simultaneously quenching the steel sheet for hot press using a tool of press forming with a forming start temperature of $Ac_3$ point −50° C. or less and 600° C. or more, to obtain a hot pressed part having the steel microstructure according to 1.

7. The method of manufacturing a hot pressed part according to 6., wherein the chemical composition further contains, in mass %, one or more groups selected from A group: one or more selected from Ni: 0.01% to 5.0%, Cu: 0.01% to 5.0%, Cr: 0.01% to 5.0%, and Mo: 0.01% to 3.0%, B group: one or more selected from Ti: 0.005% to 3.0%, Nb: 0.005% to 3.0%, V: 0.005% to 3.0%, and W: 0.005% to 3.0%, C group: one or more selected from REM: 0.0005% to 0.01%, Ca: 0.0005% to 0.01%, and Mg: 0.0005% to 0.01%, D group: Sb: 0.002% to 0.03%, and E group: B: 0.0005% to 0.05%.

8. The method of manufacturing a hot pressed part according to 6. or 7., further comprising forming a coating layer on a surface of the steel sheet for hot press, after the annealing.

9. The method of manufacturing a hot pressed part according to 8., wherein the coating layer is a zinc-based coating layer or an aluminum-based coating layer.

10. The method of manufacturing a hot pressed part according to 9., wherein the zinc-based coating layer contains Ni: 10 mass % to 25 mass %.

11. The method of manufacturing a hot pressed part according to any one of 8. to 10., wherein a coating weight of the coating layer is 10 g/m² to 90 g/m² per side.

Advantageous Effect

It is thus possible to obtain a hot pressed part having both high strength of 1100 MPa or more in tensile strength (TS) and high bendability of 70 degrees or more in bending angle. The use of this hot pressed part in automotive parts enables weight reduction of automotive bodies while ensuring high safety.

BRIEF DESCRIPTION OF THE DRAWINGS

In the accompanying drawings:

FIG. 1 is a schematic diagram of the steel microstructure of a hot pressed part according to one of the disclosed embodiments.

DETAILED DESCRIPTION

1. Hot Pressed Part

<Chemical Composition>

The chemical composition of a hot pressed part according to one of the disclosed embodiments will be described below. In the following description, "mass %" is simply written as "%" unless otherwise noted.

C: 0.18% to 0.40%

C is an element that increases the strength of the steel. To achieve the effect and ensure a tensile strength TS of 1100 MPa or more, the C content is 0.18% or more. If the C content is more than 0.40%, the degree of solid solution strengthening by C is excessively high, which is likely to cause excessive strengthening of the hot pressed part. The C content is therefore 0.18% or more and 0.40% or less.

Si: 0.01% to 2.0%

Si is an element that increases the strength of the steel by solid solution strengthening. To achieve the effect, the Si content is 0.01% or more. If the Si content is more than 2.0%, surface defects called red scale increase in hot rolling, and also the rolling load increases and the ductility of the hot-rolled steel sheet decreases. The Si content is therefore 0.01% or more and 2.0% or less. The Si content is preferably 0.02% or more. The Si content is preferably 1.2% or less.

Mn: 0.5% to 2.5%

Mn is an element effective in improving quench hardenability. To achieve the effect, the Mn content is 0.5% or more. If the Mn content is more than 2.5%, Mn segregates, which is likely to cause variation in the properties of the steel sheet for hot press as a blank sheet and the hot pressed part. The Mn content is therefore 0.5% or more and 2.5% or less. The Mn content is preferably 0.8% or more. The Mn content is preferably 2.2% or less.

P: 0.05% or Less

P is an element that exists in the steel as an inevitable impurity, and segregates to crystal grain boundaries and like and causes adverse effects such as a decrease in the toughness of the hot pressed part. The P content is therefore desirably as low as possible, but 0.05% or less P is allowable. Accordingly, the P content is 0.05% or less. The P content is preferably 0.02% or less.

Excessive dephosphorization leads to higher smelting cost, and accordingly the P content is preferably 0.0005% or more.

S: 0.05% or Less

S is contained in the steel inevitably. S exists as a sulfide inclusion in the steel, and decreases the ductility, toughness, etc. of the hot pressed part. The S content is therefore desirably as low as possible, but 0.05% or less S is allowable. Accordingly, the S content is 0.05% or less. The S content is preferably 0.005% or less.

Excessive desulfurization leads to higher smelting cost, and accordingly the S content is preferably 0.0005% or more.

Al: 0.005% to 0.1%

Al is an element that acts as a deoxidizing agent. To achieve the effect, the Al content is 0.005% or more. If the Al content is more than 0.1%, Al combines with nitrogen to form a large amount of nitride. This causes a decrease in the blanking-workability and hardenability of the steel sheet as a blank sheet. The Al content is therefore 0.005% or more and 0.1% or less. The Al content is preferably 0.02% or more. The Al content is preferably 0.05% or less.

N: 0.01% or Less

N is an element typically contained in the steel inevitably. If the N content is more than 0.01%, nitrides such as MN form during heating in hot rolling or hot press. This causes a decrease in the blanking-workability and hardenability of the steel sheet as a blank sheet. The N content is therefore 0.01% or less. The N content is preferably 0.0050% or less.

In the case where N is contained inevitably, the N content is approximately less than 0.0025%. To prevent an increase in smelting cost, the N content is preferably 0.0025% or more. The N content is more preferably 0.0030% or more.

In addition to the basic components described above, the chemical composition may contain one or more groups selected from the following A to E groups:

A Group: One or More Selected from Ni: 0.01% to 5.0%, Cu: 0.01% to 5.0%, Cr: 0.01% to 5.0%, and Mo: 0.01% to 3.0%

Ni, Cu, Cr, and Mo are each an element that increases the strength of the steel and improves hardenability. One or more of them may be selected and added as necessary. To achieve the effect, the content of each element is preferably 0.01% or more. To prevent an increase in material cost, it is preferable that the Ni, Cu, and Cr contents are each 5.0% or less and the Mo content is 3.0% or less. Thus, in the case of containing Ni, Cu, Cr, and Mo, their contents are Ni: 0.01% to 5.0%, Cu: 0.01% to 5.0%, Cr: 0.01% to 5.0%, and Mo: 0.01% to 3.0%. The content of each element is more preferably 0.01% or more. The content of each element is more preferably 1.0% or less.

B Group: One or More Selected from Ti: 0.005% to 3.0%, Nb: 0.005% to 3.0%, V: 0.005% to 3.0%, and W: 0.005% to 3.0%

Ti, Nb, V, and W are each an element that increases the strength of the steel by precipitation strengthening and also improves toughness by crystal grain refinement. One or more of them may be selected and added as necessary.

Ti has not only the effect of increasing strength and improving toughness, but also the effect of forming a nitride more preferentially than B and improving hardenability by solute B. To achieve the effects, the Ti content is preferably 0.005% or more. If the Ti content is more than 3.0%, the rolling load increases extremely in hot rolling, and also the toughness of the hot pressed part tends to decrease. Accordingly, in the case of containing Ti, the Ti content is 0.005% or more and 3.0% or less. The Ti content is more preferably 0.01% or more. The Ti content is more preferably 1.0% or less.

To achieve the above-described effect of increasing strength and improving toughness, the Nb content is preferably 0.005% or more. If the Nb content is more than 3.0%, the amount of Nb carbonitride increases, and ductility and delayed fracture resistance tend to decrease. Accordingly, in the case of containing Nb, the Nb content is 0.005% or more and 3.0% or less. The Nb content is more preferably 0.01% or more. The Nb content is more preferably 0.05% or less.

V has not only the effect of increasing strength and improving toughness, but also the effect of precipitating as a precipitate or a crystallized product and improving hydrogen embrittlement resistance as a hydrogen trap site. To achieve the effects, the V content is preferably 0.005% or more. If the V content is more than 3.0%, the amount of V carbonitride increases, and ductility tends to decrease. Accordingly, in the case of containing V, the V content is 0.005% or more and 3.0% or less. The V content is more preferably 0.01% or more. The V content is more preferably 2.0% or less.

W has not only the effect of increasing strength and improving toughness, but also the effect of improving hydrogen embrittlement resistance. To achieve the effects, the W content is preferably 0.005% or more. If the W content is more than 3.0%, ductility tends to decrease. Accordingly, in the case of containing W, the W content is 0.005% or more and 3.0% or less. The W content is more preferably 0.01% or more. The W content is more preferably 2.0% or less.

C Group: One or More Selected from REM: 0.0005% to 0.01%, Ca: 0.0005% to 0.01%, and Mg: 0.0005% to 0.01%

REM, Ca, and Mg are each an element that improves ductility and hydrogen embrittlement resistance by morphological control of an inclusion. One or more of them may be selected and added as necessary. To achieve the effect, the content of each element is preferably 0.0005% or more. To prevent a decrease in hot workability, the REM content and the Ca content are each preferably 0.01% or less. To prevent a decrease in ductility caused by the formation of a coarse oxide or sulfide, the Mg content is preferably 0.01% or less.

Thus, in the case of containing REM, Ca, and Mg, their contents are REM: 0.0005% to 0.01%, Ca: 0.0005% to 0.01%, and Mg: 0.0005% to 0.01%. The content of each element is more preferably 0.0006% or more and 0.01% or less.

D Group: Sb: 0.002% to 0.03%

Sb is an element that concentrates at the surface of the steel sheet and improves wear resistance, and may be added as necessary. To achieve the effect, the Sb content is preferably 0.002% or more. If the Sb content is more than 0.03%, the rolling load increases, and productivity decreases. Accordingly, in the case of containing Sb, the Sb content is 0.002% or more and 0.03% or less. The Sb content is more preferably 0.002% or more and 0.02% or less.

E Group: B: 0.0005% to 0.05%

B improves hardenability during hot press and toughness after hot press, and may be added as necessary. To achieve the effect, the B content is preferably 0.0005% or more. If the B content is more than 0.05%, it may cause cracking in the steel sheet by increasing the rolling load in hot rolling, or by forming martensite or bainite after hot rolling. Accordingly, in the case of containing B, the B content is 0.0005% or more and 0.05% or less. The B content is preferably 0.0005% or more. The B content is preferably 0.01% or less.

Components other than those described above are Fe and inevitable impurities.

Thus, the hot pressed part according to the present disclosure has a chemical composition containing C: 0.18% to 0.40%, Si: 0.01% to 2.0%, Mn: 0.5% to 2.5%, P: 0.05% or less, S: 0.05% or less, Al: 0.005% to 0.1%, and N: 0.01% or less, and optionally one or more groups selected from the foregoing A to E groups, with a balance consisting of Fe and inevitable impurities.

The inevitable impurities include, for example, O (oxygen). 0.0100% or less O is allowable.

<Steel Microstructure>

The steel microstructure of the hot pressed part according to one of the disclosed embodiments will be described below.

The hot pressed part according to one of the disclosed embodiments has a steel microstructure (hereafter also simply referred to as "gradient microstructure") in which, in the thickness direction, a surface layer is a soft layer, an inside is a hard layer, and a layer between the soft layer and the hard layer is a transition layer.

This gradient microstructure is such a microstructure that changes in the thickness direction of the hot pressed part. Specifically, this is a steel microstructure made up of, from one side (hereafter also simply referred to as "front side") to the other side (hereafter also simply referred to as "back side") in the thickness direction of the hot pressed part: soft layer (front side)/transition layer (front side)/hard layer/transition layer (back side)/soft layer (back side) in this order, as illustrated in FIG. 1.

The soft layer, the transition layer, and the hard layer will be described below.

Soft Layer

Volume Fraction of Ferrite in Soft Layer: 90% or More

The soft layer is a microstructure mainly composed of ferrite, and contributes to improved bendability of the hot pressed part. That is, the soft layer mainly composed of ferrite and formed in the surface layer of the steel sheet deforms easily during bending, and contributes to improved bendability. If the volume fraction of ferrite in the soft layer is less than 90%, the soft layer hardens, and the desired bending angle cannot be achieved.

The volume fraction of ferrite in the soft layer is therefore 90% or more. The volume fraction of ferrite in the soft layer may be 100%.

Examples of residual microstructures in the soft layer other than ferrite include martensite, cementite, pearlite, and bainite. An allowable volume fraction of such residual microstructures is up to 10%.

Average Grain Size of Ferrite in Soft Layer: 2 μm or More and 50 μm or Less

Ferrite in the soft layer contributes to improve bendability of the hot pressed part. However, if the average grain size of ferrite in the soft layer is less than 2 μm, the soft layer hardens due to excessive crystal grain refinement, and the desired bendability cannot be achieved. If the average grain size of ferrite in the soft layer is more than 50 μm, the soft layer softens excessively, and the desired strength cannot be achieved.

The average grain size of ferrite in the soft layer is therefore 2 μm or more and 50 μm or less. The average grain size of ferrite in the soft layer is preferably 4 μm or more. The average grain size of ferrite in the soft layer is preferably 40 μm or less.

Total Thickness of Soft Layer: 5% or More and 25% or Less of Thickness of Hot Pressed Part The soft layer contributes to improve bendability of the hot pressed part, as mentioned above. To achieve the effect, certain thickness is necessary. If the total thickness of the soft layer is less than 5% of the thickness of the hot pressed part, the bendability of the hot pressed part is insufficient. If the total thickness of the soft layer is more than 25% of the thickness of the hot pressed part, the desired strength cannot be achieved.

The total thickness of the soft layer is therefore 5% or more and 25% or less of the thickness of the hot pressed part. The total thickness of the soft layer is preferably 8% or more of the thickness of the hot pressed part. The total thickness of the soft layer is preferably 20% or less of the thickness of the hot pressed part.

Herein, the thickness of the soft layer is the thickness of the soft layer in the thickness direction of the hot pressed part. The total thickness of the soft layer is the sum of the thickness of the soft layer formed at the front side of the hot pressed part and the thickness of the soft layer formed at the back side of the hot pressed part. The same applies to the below-described thickness of the transition layer and total thickness of the transition layer.

Transition Layer

Total Thickness of Transition Layer: 5% or More and 25% or Less of Thickness of Hot Pressed Part The transition layer is an intermediate layer between the soft layer and the hard layer, and is essential to gradually change the stress gradient with respect to bending deformation. If the total thickness of the transition layer is less than 5% of the thickness of the hot pressed part, cracking occurs in the hot pressed part due to bending deformation, and the desired bendability cannot be achieved. If the total thickness of the transition layer is more than 25% of the thickness of the hot pressed part, the desired strength cannot be achieved.

The total thickness of the soft layer is therefore 5% or more and 25% or less of the thickness of the hot pressed part. The total thickness of the transition layer is preferably 8% or more of the thickness of the hot pressed part. The total thickness of the transition layer is preferably 20% or less of the thickness of the hot pressed part.

The transition layer is a layer in which the area ratio of ferrite changes in a range of more than 10% and less than 90% in the thickness direction of the hot pressed part.

Accordingly, the boundary between the transition layer and the hard layer and the boundary between the transition layer and the soft layer in the thickness direction are respectively defined as a thickness position at which the area ratio of ferrite changes from 10% or less to more than 10% and a thickness position at which the area ratio of ferrite changes from 90% or more to less than 90%.

The microstructure of the transition layer is basically composed of ferrite and martensite, although about 20% of cementite, pearlite, bainite, and the like may be included as residual microstructures other than ferrite and martensite.

Hard Layer

Volume Fraction of Martensite in Hard Layer: 90% or More

The hard layer is a microstructure mainly composed of martensite. To ensure desired tensile strength TS of 1100 MPa or more in a second region, the volume fraction of martensite in the hard layer needs to be 90% or more. The volume fraction of martensite in the hard layer is preferably 95% or more.

Examples of residual microstructures in the hard layer except for martensite include ferrite, cementite, pearlite, and bainite. An allowable volume fraction of such residual microstructures is up to 10%.

The definition of the soft layer, the transition layer, and the hard layer, the measurement of the thickness of each layer, and the measurement of the volume fraction of metallic microstructure in each layer are performed as follows.

A microstructure observation test piece is collected from a top portion of a hat-shaped part of the hot pressed part so that the observation plane is parallel to the rolling direction and perpendicular to the surface of the top portion of the hat-shaped part. The observation plane is then polished, and etched with a 3 vol. % nital solution to expose the microstructure. The microstructure at each of various thickness positions is observed using a scanning electron microscope (at 1500 magnifications) and photographed. From the obtained micrograph at each of various thickness positions, the microstructure at the thickness position is identified by image analysis. A phase observed as black with a relatively smooth surface is identified as ferrite. A phase observed as white state of film or lump in crystal grain boundaries is identified as cementite. A phase in which ferrite and cementite form in layers is identified as pearlite. A phase in which a carbide forms between laths and a phase made of bainitic ferrite having no carbide in grains are identified as bainite. Regions other than these phases are identified as martensite.

The occupancy area ratio of each phase in each micrograph is derived, and a thickness position at which the area ratio of ferrite changes from 10% or less to more than 10% and a thickness position at which the area ratio of ferrite changes from 90% or more to less than 90% are determined. The soft layer, the transition layer, and the hard layer are defined from these thickness positions, and the thickness of each layer is measured.

By macroscopically observing, from the top portion of the hat-shaped part of the hot pressed part, the plane parallel to the rolling direction and perpendicular to the surface of the top portion of the hat-shaped part and by determining the changes in microstructure in the thickness direction beforehand, the thickness position at which the area ratio of ferrite changes from 10% or less to more than 10% and the thickness position at which the area ratio of ferrite changes from 90% or more to less than 90% can be determined efficiently.

The observation interval is 1 μm in the thickness direction when determining the thickness position at which the area ratio of ferrite changes from 10% or less to more than 10% and in the thickness position at which the area ratio of ferrite changes from 90% or more to less than 90%.

The volume fraction of each phase in the soft layer is measured by observing each soft layer at 100 μm interval (50 μm interval in the vicinity of each layer interface) in the thickness direction, identifying each phase and deriving its occupancy area ratio from the obtained micrographs in the above-described manner, and averaging the results. The volume fraction of each phase in each of the transition layer and the hard layer is measured in the same way as the soft layer.

The average grain size of ferrite in the soft layer is measured by determining the area of each ferrite grain from a micrograph at each of ¼ position in a thickness, ½ position in a thickness, and ¾ position in a thickness for each soft layer by image analysis, calculating an equivalent circular diameter, and averaging the calculated values. Crystal grains of 0.01 μm or more in grain size are subjected to the measurement of the average grain size of ferrite.

(Coating Layer)

The hot pressed part according to one of the disclosed embodiments may have a coating layer on its surface.

In the case where the steel sheet for hot press is a coated steel sheet, a coating layer remains on the surface of the formed hot pressed part. In such a case, oxide scale formation is suppressed during heating in hot press. The hot pressed part can thus be put to use without oxide scale exfoliation on the surface, which contributes to improved productivity.

The coating layer is preferably a zinc-based coating layer (in other words, a zinc or zinc alloy coating layer) or an aluminum-based coating layer (in other words, an aluminum or aluminum alloy coating layer). In the case where corrosion resistance is required, a zinc-based coating layer is better than an aluminum-based coating layer, because the corrosion rate of the steel substrate can be reduced by the sacrificial protection effect of zinc. Moreover, in the case of hot pressing the coated steel sheet, a zinc oxide film forms in the initial stage of heating in the hot press process, so that evaporation of Zn can be prevented in the subsequent treatment of the hot pressed part.

Examples of the zinc-based coating include typical hot-dip galvanizing (GI), galvannealing (GA), and Zn—Ni-based coating. Zn—Ni-based coating is particularly preferable. A Zn—Ni-based coating layer can remarkably suppress oxide scale formation during hot press heating, and also prevent liquid metal embrittlement cracking. To achieve the effects, the Zn—Ni-based coating layer preferably contains 10 mass % to 25 mass % Ni. If the Ni content is more than 25 mass %, the effects are saturated.

Examples of the aluminum-based coating layer include Al-10 mass % Si coating.

<Other Features>

The thickness of the hot pressed part is about 0.5 mm to 2.5 mm. The thickness of the hot pressed part does not include the thickness of the coating layer.

2. Method of Manufacturing Hot Pressed Part

A method of manufacturing a hot pressed part according to one of the disclosed embodiments will be described below.

The method of manufacturing a hot pressed part according to one of the disclosed embodiments includes:

heating a slab having the above-described chemical composition, and hot rolling the slab to obtain a hot-rolled steel sheet;

cold rolling the hot-rolled steel sheet to obtain a cold-rolled steel sheet;

heating the cold-rolled steel sheet to a temperature range of $Ac_1$-50° C. or more and less than $Ac_3$ point in an atmosphere of a dew point of 50° C. or more and 90° C. or less, thereafter retaining the cold-rolled steel sheet in the atmosphere and in the temperature range for 5 min or more and 90 min or less, and thereafter cooling the cold-rolled steel sheet, to obtain a steel sheet for hot press; and heating the steel sheet for hot press to a temperature range of $Ac_3$ point or more and 1000° C. or less, retaining the steel sheet for hot press in the temperature range for 10 sec or more and 900 sec or less, and thereafter press forming and simultaneously quenching the steel sheet for hot press using a tool of press forming with a forming start temperature of $Ac_3$ point −50° C. or less and 600° C. or more, to manufacture a hot pressed part having the above-described steel microstructure.

Each step will be described below.

<Obtainment of Hot-Rolled Steel Sheet>

The obtainment of the hot-rolled steel sheet is not limited, and may be performed according to a usual method.

For example, molten steel having the above-described chemical composition is subjected to melting in a converter or the like, and produced into a slab by a continuous casting process in order to prevent macrosegregation. An ingot-making process or a thin slab continuous casting process may be used instead of the continuous casting process.

The obtained slab is then cooled to the room temperature, and then charged into a heating furnace for reheating. Alternatively, an energy saving process such as a process of charging the slab into the heating furnace as a warm slab without cooling the slab to the room temperature or a process of heat-retaining the slab for a short time and then immediately hot rolling the slab may be used.

Subsequently, the slab is heated to a predetermined heating temperature, and then hot rolled to obtain a hot-rolled steel sheet. The heating temperature is, for example, 1000° C. to 1300° C. Here, the slab is typically hot rolled with a finish rolling inlet temperature of 1100° C. or less and a finish rolling outlet temperature of 800° C. to 950° C.

After the hot rolling, the hot-rolled steel sheet is typically cooled at an average cooling rate of 5° C./sec or more, and coiled at a coiling temperature of 300° C. to 750° C.

<Obtainment of Cold-Rolled Steel Sheet>

After this, the hot-rolled steel sheet is cold rolled to obtain a cold-rolled steel sheet. To prevent abnormal grain growth in the subsequent annealing or the heating immediately before the hot press, the total rolling reduction in the cold rolling is preferably 30% or more, and more preferably 50% or more. To prevent an increase in rolling load and a decrease in productivity, the total rolling reduction is preferably 85% or less.

The hot-rolled steel sheet before the cold rolling may be subjected to oxide scale exfoliation by pickling or the like. In the case where the rolling load in the cold rolling is high, the hot-rolled steel sheet may be subjected to soft annealing.

<Annealing>

Subsequently, the cold-rolled steel sheet is subjected to annealing of heating the cold-rolled steel sheet to a temperature range of $Ac_1$-50° C. or more and less than $Ac_3$ point in an atmosphere of a dew point of 50° C. or more and 90° C. or less, then retaining the cold-rolled steel sheet in the atmosphere and in the temperature range for 5 min or more and 90 min or less, and then cooling the cold-rolled steel sheet, to obtain a steel sheet for hot press.

The conditions in the annealing will be described below.

Dew Point: 50° C. or More and 90° C. or Less

The dew point of the annealing atmosphere needs to be 50° C. or more and 90° C. or less, to suppress oxide scale which generates during annealing. If a large amount of oxide scale generates on the steel sheet surface, the product sheet thickness decreases. This may cause a gap with the tool of press forming in the hot press, and result in incomplete quench hardening. Besides, the product sheet thickness after the hot press may be compromised. If the dew point is less than 50° C., FeO forms, and the growth of oxide scale is facilitated. Meanwhile, the effect of suppressing oxide scale generation is saturated when the dew point is at a certain high temperature or more. Hence, the upper limit of the dew point of the annealing atmosphere is set to 90° C. in terms of production management. The dew point is preferably 60° C. or more. The dew point is preferably 80° C. or less.

Heating Temperature (Annealing Temperature): $Ac_1$ Point −50° C. or More and Less than $Ac_3$ Point The heating temperature needs to be $Ac_1$ point −50° C. or more and less than $Ac_3$ point. If the heating temperature is less than $Ac_1$ point −50° C., the diffusion speed of carbon is slow, and decarburization does not progress sufficiently. In the case where the steel sheet for hot press obtained in this way is hot pressed to manufacture a hot pressed part, martensite forms in the vicinity of the surface layer during rapid cooling in the hot press, so that the gradient microstructure having the desired soft layer cannot be obtained. If the heating temperature is $Ac_3$ point or more, manganese band generates in the steel sheet for hot press, which decreases the bendability of the hot pressed part. The heating temperature is preferably $Ac_1$-25° C. or more. The heating temperature is preferably $Ac_3$-25° C. or less.

$Ac_1$ point (° C.) and $Ac_3$ point (° C.) are calculated according to the following formulas:

$$Ac_1 \text{ point (° C.)} = 751 - 16C + 11Si - 28Mn - 5.5Cu - 16Ni + 13Cr + 3.4Mo$$

$$Ac_3 \text{ point (° C.)} = 910 - 203C^{1/2} + 44.7Si - 4Mn + 11Cr$$

where C, Si, Mn, Ni, Cu, Cr, and Mo are each the content (mass %) of the corresponding element in the steel sheet for hot press. In the case where the element is not contained, the content of the element is assumed to be 0 in the calculation of $Ac_1$ point and $Ac_3$ point.

Retention Time: 5 Min or More and 90 Min or Less

The retention time (annealing time) in the heating temperature range needs to be 5 min or more and 90 min or less. If the retention time is less than 5 min, decarburization in the vicinity of the surface layer does not progress sufficiently. In the case where the steel sheet for hot press obtained in this way is hot pressed to manufacture a hot pressed part, martensite forms in the vicinity of the surface layer during rapid cooling in the hot press, so that the gradient microstructure having the desired soft layer cannot be obtained. If the retention time is more than 90 min, decarburization progresses excessively, which causes an increase in the thickness of the soft layer. Consequently, the desired strength of the hot pressed part cannot be achieved.

The retention time is therefore 5 min or more and 90 min or less. The retention time is preferably 10 min or more. The retention time is preferably 60 min or less.

The cooling after the heating retention is not limited. It is preferable to appropriately perform the cooling by radiational cooling (gradual cooling) or controlled cooling depending on, for example, the heating furnace used.

The annealing is preferably performed in a batch annealing furnace. The treatment conditions in the batch annealing furnace except for the above-described conditions are not limited. For example, it is preferable to set the heating rate to 150° C./hr or less and the cooling rate after the heating retention to 40° C./hr or more, in terms of uniformizing in-coil temperature. The atmosphere is preferably a non-oxidizing atmosphere (argon, hydrogen, hydrogen-nitrogen mixture), to suppress oxide scale formation.

<Coating>

A coating layer may be formed on the surface of the steel sheet for hot press after the annealing. The resulting coated steel sheet can be used as a steel sheet for hot press to manufacture a hot pressed part having a coating layer on its surface, which is very advantageous in terms of productivity.

In the case where no coating layer is formed on the surface of the steel sheet for hot press, oxide scale exfoliation treatment such as shot blasting needs to be performed on the hot pressed part after the below-described hot press. In the case where a coating layer is formed on the surface of the steel sheet for hot press, on the other hand, oxide scale formation is suppressed during heating in the hot press, so that oxide scale exfoliation treatment after the hot press is unnecessary. This improves productivity, too.

The coating weight of the coating layer is preferably 10 $g/m^2$ to 90 $g/m^2$ per side. If the coating weight of the coating layer is 10 $g/m^2$ or more, the effect of suppressing oxide scale generation during heating is sufficient. The coating weight of the coating layer is more preferably 30 $g/m^2$ or more. If the coating weight of the coating layer is 90 $g/m^2$ or less, productivity is not hampered. The coating weight of the coating layer is more preferably 70 $g/m^2$ or less. The components of the coating layer are as described above.

Pickling and/or temper rolling may be performed as appropriate between the steps described above.

<Hot Press>

The steel sheet for hot press obtained as described above is heated to a temperature range of $Ac_3$ point or more and 1000° C. or less, retained in the temperature range for 10 sec or more and 900 sec or less, and then press formed and simultaneously quenched using a tool of press forming with a forming start temperature of $Ac_3$ point −50° C. or less and 600° C. or more, to obtain a hot pressed part having the above-described steel microstructure.

The conditions in the hot press will be described below.

Heating Temperature: $Ac_3$ Point or More and 1000° C. or Less

If the heating temperature is less than $Ac_3$ point which is in an austenite single phase region, austenitization is insufficient. As a result, the desired amount of martensite in the hot pressed part cannot be ensured, and the desired tensile strength cannot be achieved.

If the heating temperature is more than 1000° C., carbon homogenizes in the sheet thickness direction of the steel sheet, and the thicknesses of the soft layer and the transition layer decrease. Hence, the desired bending angle cannot be achieved.

The heating temperature is therefore $Ac_3$ point or more and 1000° C. or less. The heating temperature is preferably ($Ac_3$ point+30) ° C. or more. The heating temperature is preferably 950° C. or less.

The heating rate to the heating temperature is not limited, but is preferably 1° C./sec to 400° C./sec, and more preferably 10° C./sec to 150° C./sec. If the heating rate is 1° C./sec or more, productivity is not hampered. If the heating rate is 400° C./sec or less, temperature control is stable.

Retention Time: 10 Sec or More and 900 Sec or Less

With the passage of the retention time in the heating temperature range, carbon homogenizes in the sheet thickness direction of the steel sheet. In particular, if the retention time is more than 900 sec, the thicknesses of the soft layer and the transition layer in the hot pressed part decrease, and the desired bending angle cannot be achieved. If the retention time is less than 10 sec, reverse transformation to austenite is insufficient, and the desired strength cannot be achieved.

The retention time is therefore 10 sec or more and 900 sec or less. The retention time is preferably 30 sec or more. The retention time is preferably 600 sec or less.

Forming Start Temperature: $Ac_3$ Point −50° C. or Less and 600° C. or More

The steel sheet for hot press heated and retained as described above is then subjected to hot press forming of press forming and simultaneously quenching the steel sheet using a tool of press forming, to obtain a hot pressed part of a predetermined shape. Hot press forming is a process of press forming a heated thin steel sheet using a tool of press forming and simultaneously rapid-cooling it, and is also referred to as "hot forming", "hot stamping", "die quenching", etc.

In the steel sheet for hot press heated and retained as described above, ferrite transformation starts from a region low in carbon concentration, and the soft layer is formed. If the forming start temperature is more than $Ac_3$ point −50° C., the formation of the soft layer is insufficient, and the desired bendability cannot be achieved. If the forming start temperature is less than 600° C., the formation of the hard layer is insufficient, and the desired strength cannot be achieved.

Hence, the forming start temperature needs to be $Ac_3$ point −50° C. or less and 600° C. or more. The forming start temperature is preferably $Ac_3$ point −60° C. or less. The forming start temperature is preferably 625° C. or more.

The cooling rate in the tool of press forming is not limited. In terms of productivity, the average cooling rate to 200° C. is preferably 20° C./sec or more, and more preferably 40° C./sec or more. In typical cooling using a tool of press forming, the average cooling rate to 200° C. is 20° C./sec or more.

The removal time from the tool of press forming and the cooling rate after the removal are not limited. For example, a tool of press forming composed of a die (for press forming) and a punch (for press forming) is used in such a manner that the punch is held at the bottom dead center for 1 sec to 60 sec and the hot pressed part is cooled by the die and the punch. After this, the hot pressed part is removed from the tool of press forming, and cooled. The cooling in the tool of press forming and the cooling after the removal from the tool of press forming may be performed in combination with a cooling method using a refrigerant such as gas or liquid. This improves productivity.

EXAMPLES

Each molten steel having the chemical composition (the balance consisting of Fe and inevitable impurities) listed in Tables 1 and 4 was subjected to melting in a small vacuum melting furnace, to produce a slab. The obtained slab was heated to 1250° C., and further subjected to hot rolling including rough rolling and finish rolling, to obtain a hot-rolled steel sheet. The finish rolling inlet temperature was 1100° C., and the finish rolling outlet temperature was 850° C. The cooling rate after the hot rolling end was 15° C./sec on average from 800° C. to 600° C., and the coiling temperature was 650° C.

The obtained hot-rolled steel sheet was pickled, and cold rolled at a total rolling reduction of 54%, to obtain a cold-rolled steel sheet (sheet thickness: 1.6 mm). The obtained cold-rolled steel sheet was annealed under the conditions listed in Tables 2 and 5, to obtain a steel sheet for hot press. The cooling rate after the annealing retention was 40° C./hr for each sample.

As listed in Tables 2 and 5, some steel sheets for hot press were subjected to coating treatment after the annealing. In Tables 2 and 5, "Zn—Ni coating" denotes Zn-12 mass % Ni coating treatment (coating layer). The coating weight of each coating layer was 60 g/m² per side.

The steel sheet for hot press obtained as described above was heated and retained under the conditions listed in Tables 3 and 6 and then conveyed to a press machine, and subjected to hot press with the forming start temperature listed in Tables 3 and 6, to obtain a hot pressed part having a cross-sectional shape of hat-shaped part. The hot press was performed using a punch having a width of 70 mm and a shoulder radius R of 6 mm and a die having a shoulder radius R of 6 mm as a tool of press forming, with a forming depth of 30 mm.

In the case of performing the heating using an electric heating furnace in the air, the average heating rate from the room temperature to 750° C. was 7.5° C./sec, and the average heating rate from 750° C. to the heating temperature was 2.0° C./sec. In the case of performing the heating using a direct current heater in the air, the average heating rate from the room temperature to the heating temperature was 100° C./sec. After reaching the heating temperature, the steel sheet was retained at the heating temperature.

The cooling in the tool of press forming was performed as follows. The steel sheet was cooled to 150° C. or less by a combination of: clamping the steel sheet using the die and the punch in such a manner that the punch is held at the bottom dead center for 15 sec; and air cooling on the die after release from the clamping. The average cooling rate from the forming start temperature to 200° C. was 100° C./sec.

A JIS No. 5 tensile test piece (parallel portion width: 25 mm, parallel portion length: 60 mm, GL=50 mm) was collected from the position of a top portion of a hat-shaped part of the obtained hot pressed part, and a tensile test was conducted according to JIS Z 2241 to determine the tensile strength TS and the total elongation.

Moreover, a bend test piece (width: 60 mm, length: 60 mm) was collected from the position of the top portion of the hat-shaped part of the hot pressed part, and a bend test was conducted according to German Automotive Industry (VDA) standard VDA238-100 to measure the bending angle. Assuming the time at which the bending load started to drop as the bending limitation, the bending angle was calculated from the punch stroke at the time.

The results are listed in Tables 3 and 6.

For the obtained hot pressed part, the definition of the soft layer, the transition layer, and the hard layer, the derivation of the thickness of each layer, and the measurement of the volume fraction of metallic microstructure in each layer and the average grain size of ferrite in the soft layer were performed by the methods described above.

The results are listed in Tables 3 and 6. In these hot pressed parts except pressed part ID 2 in which no soft layer was formed and pressed part ID 8 and 10 in which no transition layer was formed, a steel microstructure made up of, from the front to the back in the thickness direction: soft layer/transition layer/hard layer/transition layer/soft layer in this order as illustrated in FIG. 1 was obtained. The thickness of the hard layer can be calculated by subtracting the thicknesses of the soft layer and the transition layer from the thickness of the hot pressed part (1.6 mm).

TABLE 1

| | Chemical composition | | | | | | | | |
|---|---|---|---|---|---|---|---|---|---|
| Steel ID | C (mass %) | Si (mass %) | Mn (mass %) | P (mass %) | S (mass %) | Al (mass %) | N (mass %) | $Ac_1$ point (° C.) | $Ac_3$ point (° C.) | Remarks |
| A | 0.220 | 0.250 | 1.25 | 0.0019 | 0.0025 | 0.035 | 0.0030 | 715 | 821 | Conforming steel |
| B | 0.277 | 0.078 | 1.73 | 0.0024 | 0.0012 | 0.032 | 0.0033 | 699 | 800 | Conforming steel |
| C | 0.450 | 0.250 | 1.25 | 0.0019 | 0.0025 | 0.035 | 0.0030 | 712 | 780 | Comparative steel |
| D | 0.150 | 0.250 | 1.25 | 0.0019 | 0.0025 | 0.035 | 0.0030 | 716 | 838 | Comparative steel |
| E | 0.220 | 0.700 | 1.25 | 0.0019 | 0.0025 | 0.035 | 0.0030 | 720 | 841 | Conforming steel |
| F | 0.220 | 1.000 | 1.45 | 0.0019 | 0.0021 | 0.031 | 0.0032 | 718 | 854 | Conforming steel |
| G | 0.220 | 1.500 | 1.54 | 0.0022 | 0.0023 | 0.035 | 0.0039 | 721 | 876 | Conforming steel |
| H | 0.220 | 1.800 | 1.25 | 0.0019 | 0.0025 | 0.035 | 0.0030 | 732 | 890 | Conforming steel |
| I | 0.220 | 0.250 | 1.80 | 0.0019 | 0.0025 | 0.035 | 0.0030 | 700 | 819 | Conforming steel |
| J | 0.220 | 0.250 | 2.00 | 0.0019 | 0.0025 | 0.035 | 0.0030 | 694 | 818 | Conforming steel |
| K | 0.220 | 0.250 | 2.20 | 0.0019 | 0.0025 | 0.035 | 0.0030 | 689 | 817 | Conforming steel |
| L | 0.357 | 0.130 | 1.74 | 0.0013 | 0.0020 | 0.030 | 0.0030 | 698 | 788 | Conforming steel |
| M | 0.232 | 0.079 | 1.81 | 0.0017 | 0.0019 | 0.031 | 0.0030 | 698 | 809 | Conforming steel |
| N | 0.376 | 0.232 | 1.75 | 0.0017 | 0.0018 | 0.038 | 0.0031 | 699 | 789 | Conforming steel |
| O | 0.339 | 0.207 | 1.64 | 0.0014 | 0.0021 | 0.031 | 0.0031 | 702 | 795 | Conforming steel |
| P | 0.372 | 0.075 | 1.25 | 0.0016 | 0.0020 | 0.036 | 0.0037 | 711 | 785 | Conforming steel |
| Q | 0.368 | 0.243 | 1.79 | 0.0022 | 0.0012 | 0.038 | 0.0036 | 698 | 791 | Conforming steel |
| R | 0.221 | 0.250 | 0.80 | 0.0019 | 0.0025 | 0.031 | 0.0030 | 728 | 823 | Conforming steel |
| S | 0.221 | 0.250 | 1.10 | 0.0014 | 0.0025 | 0.035 | 0.0030 | 719 | 821 | Conforming steel |
| T | 0.221 | 1.230 | 2.30 | 0.0014 | 0.0021 | 0.035 | 0.0031 | 697 | 860 | Conforming steel |
| U | 0.321 | 0.240 | 1.23 | 0.0032 | 0.0040 | 0.033 | 0.0036 | 714 | 801 | Conforming steel |
| V | 0.370 | 0.250 | 1.25 | 0.0030 | 0.0041 | 0.039 | 0.0031 | 713 | 793 | Conforming steel |
| W | 0.220 | 0.250 | 1.25 | 0.0032 | 0.0025 | 0.080 | 0.0030 | 715 | 821 | Conforming steel |
| X | 0.220 | 0.250 | 1.25 | 0.0032 | 0.0025 | 0.010 | 0.0030 | 715 | 821 | Conforming steel |

TABLE 2

| | | Annealing conditions | | | |
|---|---|---|---|---|---|
| Steel sheet ID | Steel ID | Dew point (° C.) | Heating temperature (° C.) | Retention time (min) | Coating treatment |
| A1 | A | 63 | 741 | 62 | Zn—Ni coating |
| A2 | A | 51 | 866 | 62 | None |
| A3 | A | 52 | 655 | 62 | Zn—Ni coating |
| A4 | A | 73 | 745 | 1 | Zn—Ni coating |
| A5 | A | 55 | 740 | 95 | Zn—Ni coating |
| B1 | B | 70 | 787 | 12 | None |
| B2 | B | 71 | 789 | 13 | Zn—Ni coating |
| B3 | B | 72 | 788 | 13 | None |
| B4 | B | 74 | 789 | 12 | None |
| B5 | B | 72 | 790 | 12 | None |
| B6 | B | 70 | 790 | 13 | None |
| B7 | B | 70 | 790 | 12 | None |

TABLE 2-continued

Annealing conditions

| Steel sheet ID | Steel ID | Dew point (° C.) | Heating temperature (° C.) | Retention time (min) | Coating treatment |
|---|---|---|---|---|---|
| C1 | C | 65 | 744 | 62 | None |
| D1 | D | 63 | 744 | 62 | None |
| E1 | E | 64 | 743 | 63 | None |
| F1 | F | 65 | 744 | 63 | None |
| G1 | G | 64 | 744 | 62 | None |
| H1 | H | 64 | 744 | 62 | None |
| I1 | I | 63 | 741 | 62 | None |
| J1 | J | 65 | 742 | 62 | None |
| K1 | K | 64 | 744 | 63 | None |
| L1 | L | 54 | 679 | 73 | None |
| M1 | M | 74 | 797 | 85 | None |
| N1 | N | 69 | 735 | 21 | None |
| O1 | O | 66 | 750 | 30 | Zn—Ni coating |
| P1 | P | 71 | 721 | 34 | Zn—Ni coating |
| Q1 | Q | 56 | 652 | 57 | None |
| Q2 | Q | 42 | 655 | 55 | None |
| R1 | R | 71 | 730 | 29 | Zn—Ni coating |
| S1 | S | 60 | 762 | 57 | Zn—Ni coating |
| T1 | T | 69 | 647 | 71 | Zn—Ni coating |
| U1 | U | 74 | 704 | 18 | Zn—Ni coating |
| V1 | V | 53 | 702 | 31 | Zn—Ni coating |
| W1 | W | 70 | 673 | 29 | Zn—Ni coating |
| X1 | X | 52 | 717 | 62 | Zn—Ni coating |

TABLE 3

| | | Hot press conditions | | | Microstructure of hot pressed part | | | | | |
|---|---|---|---|---|---|---|---|---|---|---|
| | | | | | Ferrite | | Residual microstructure | Soft layer | | Ratio of total thickness of soft layer to thickness of hot |
| Pressed part ID | Steel sheet ID | Heating temperature (° C.) | Retention time (sec) | Forming start temperature (° C.) | volume fraction (%) | Ferrite grain size (μm) | volume fraction (%) | Constituent phase of residual microstructure | Total thickness (μm) | pressed part (%) |
| 1 | A1 | 910 | 14 | 685 | 91.1 | 8.9 | 8.9 | M | 113 | 7.1 |
| 2 | A2 | 912 | 14 | 690 | — | — | — | — | — | — |
| 3 | A3 | 910 | 14 | 695 | 90.1 | 42.9 | 9.9 | M | 17 | 1.1 |
| 4 | A4 | 910 | 14 | 695 | 92.2 | 2.0 | 7.8 | M | 15 | 0.9 |
| 5 | A5 | 910 | 15 | 690 | 90.3 | 41.4 | 9.7 | M | 505 | 31.6 |
| 6 | B1 | 944 | 381 | 705 | 93.2 | 39.5 | 6.8 | M | 162 | 10.1 |
| 7 | B2 | 1050 | 381 | 713 | 93.4 | 20.9 | 6.6 | M | 15 | 0.9 |
| 8 | B3 | 750 | 381 | 706 | 90.6 | 23.9 | 9.4 | M | 120 | 7.5 |
| 9 | B4 | 950 | 1200 | 712 | 93.1 | 22.0 | 6.9 | M | 10 | 0.6 |
| 10 | B5 | 946 | 5 | 713 | 90.9 | 28.5 | 9.1 | M | 125 | 7.8 |
| 11 | B6 | 948 | 381 | 785 | 91.4 | 2.3 | 8.6 | M | 20 | 1.3 |
| 12 | B7 | 945 | 382 | 500 | 90.7 | 38.2 | 9.3 | M | 350 | 21.9 |
| 13 | C1 | 913 | 14 | 695 | 91.0 | 13.1 | 9.0 | M | 160 | 10.0 |
| 14 | D1 | 914 | 15 | 687 | 92.5 | 4.7 | 7.5 | M | 158 | 9.9 |
| 15 | E1 | 917 | 14 | 689 | 93.2 | 19.2 | 6.8 | M | 101 | 6.3 |
| 16 | F1 | 911 | 15 | 686 | 90.8 | 45.0 | 9.2 | M | 102 | 6.4 |
| 17 | G1 | 912 | 14 | 692 | 92.2 | 45.9 | 7.8 | M | 159 | 9.9 |
| 18 | H1 | 917 | 15 | 686 | 90.0 | 3.1 | 10.0 | M | 123 | 7.7 |
| 20 | I1 | 913 | 15 | 695 | 92.4 | 46.1 | 7.6 | M | 105 | 6.5 |
| 21 | J1 | 914 | 14 | 687 | 90.5 | 25.0 | 9.5 | M | 162 | 10.1 |
| 22 | K1 | 911 | 14 | 692 | 90.9 | 49.9 | 9.1 | M | 154 | 9.6 |
| 23 | L1 | 947 | 386 | 701 | 93.4 | 9.0 | 6.6 | M | 133 | 8.3 |
| 24 | M1 | 874 | 335 | 697 | 93.6 | 2.3 | 6.4 | M | 141 | 8.8 |
| 25 | N1 | 948 | 400 | 681 | 90.4 | 9.1 | 9.6 | M | 111 | 6.9 |
| 26 | O1 | 896 | 333 | 702 | 91.3 | 34.0 | 8.7 | M | 141 | 8.8 |
| 27 | P1 | 900 | 325 | 729 | 93.2 | 47.0 | 6.8 | M | 114 | 7.2 |
| 28 | Q1 | 902 | 393 | 686 | 91.9 | 25.3 | 8.1 | M | 117 | 7.3 |
| 29 | Q2 | 900 | 390 | 685 | 91.0 | 8.0 | 9.0 | M | 15 | 0.9 |
| 30 | R1 | 879 | 396 | 718 | 91.7 | 17.7 | 8.3 | M | 140 | 8.7 |
| 31 | S1 | 855 | 332 | 726 | 92.1 | 22.5 | 7.9 | M | 130 | 8.1 |
| 32 | T1 | 903 | 330 | 719 | 92.9 | 30.3 | 7.1 | M | 117 | 7.3 |
| 33 | U1 | 869 | 374 | 691 | 90.6 | 8.7 | 9.4 | M | 131 | 8.2 |
| 34 | V1 | 945 | 394 | 684 | 92.0 | 32.2 | 8.0 | M | 96 | 6.0 |
| 35 | W1 | 868 | 302 | 712 | 93.9 | 22.4 | 6.1 | M | 104 | 6.5 |
| 36 | X1 | 906 | 399 | 713 | 92.0 | 2.0 | 8.0 | M | 140 | 8.7 |

TABLE 3-continued

| | | Microstructure of hot pressed part | | | | | | | |
|---|---|---|---|---|---|---|---|---|---|
| | | Transition layer | | Hard layer | | | Mechanical properties of hot pressed part | | |
| Pressed part ID | Total thickness (μm) | Ratio of total thickness of transition layer to thickness of hot pressed part (%) | Martensite volume fraction (%) | Residual microstructure volume fraction (%) | Constituent phase of residual microstructure | TS (MPa) | Total elongation (%) | Bending angle (°) | Remarks |
|---|---|---|---|---|---|---|---|---|---|
| 1 | 150 | 9.4 | 92.0 | 8.0 | F | 1321.0 | 11.3 | 79.6 | Example |
| 2 | 500 | 31.3 | 92.8 | 7.2 | F | 1387.1 | 10.5 | 45.0 | Comparative Example |
| 3 | 15 | 0.9 | 93.5 | 6.5 | F | 1467.4 | 9.1 | 55.0 | Comparative Example |
| 4 | 20 | 1.3 | 93.8 | 6.2 | F | 1467.8 | 9.1 | 50.0 | Comparative Example |
| 5 | 525 | 32.8 | 93.1 | 6.9 | F | 409.0 | 20.2 | 150.1 | Comparative Example |
| 6 | 159 | 9.9 | 91.7 | 8.3 | F | 1333.8 | 10.2 | 78.4 | Example |
| 7 | 16 | 1.0 | 92.6 | 7.4 | F | 1711.3 | 8.5 | 64.4 | Comparative Example |
| 8 | — | — | 65.0 | 35.0 | F | 985.0 | 15.2 | 50.0 | Comparative Example |
| 9 | 12 | 0.8 | 93.7 | 6.3 | F | 1723.8 | 8.1 | 51.0 | Comparative Example |
| 10 | — | — | 66.0 | 34.0 | F | 979.0 | 15.1 | 52.0 | Comparative Example |
| 11 | 25 | 1.6 | 94.0 | 6.0 | F | 1694.4 | 7.8 | 55.0 | Comparative Example |
| 12 | 550 | 34.4 | 90.9 | 9.1 | F | 621.0 | 23.8 | 132.0 | Comparative Example |
| 13 | 117 | 7.3 | 93.2 | 6.8 | F | 2520.0 | 5.0 | 42.3 | Comparative Example |
| 14 | 145 | 9.1 | 90.0 | 10.0 | F | 995.0 | 13.3 | 109.4 | Comparative Example |
| 15 | 112 | 7.0 | 91.6 | 8.4 | F | 1294.0 | 11.0 | 81.2 | Example |
| 16 | 158 | 9.9 | 91.7 | 8.3 | F | 1262.9 | 11.0 | 90.9 | Example |
| 17 | 103 | 6.4 | 91.7 | 8.3 | F | 1223.6 | 11.1 | 91.6 | Example |
| 18 | 172 | 10.7 | 91.6 | 8.4 | F | 1226.8 | 11.4 | 93.2 | Example |
| 20 | 110 | 6.9 | 93.1 | 6.9 | F | 1290.4 | 9.9 | 89.1 | Example |
| 21 | 141 | 8.8 | 93.0 | 7.0 | F | 1193.1 | 11.6 | 91.9 | Example |
| 22 | 148 | 9.3 | 92.1 | 7.9 | F | 1199.3 | 10.8 | 96.2 | Example |
| 23 | 111 | 6.9 | 91.0 | 9.0 | F | 1674.6 | 7.0 | 72.0 | Example |
| 24 | 160 | 10.0 | 94.0 | 6.0 | F | 1242.7 | 11.6 | 85.0 | Example |
| 25 | 172 | 10.8 | 92.8 | 7.2 | F | 1689.8 | 7.8 | 78.0 | Example |
| 26 | 133 | 8.3 | 92.3 | 7.7 | F | 1573.6 | 7.8 | 74.9 | Example |
| 27 | 138 | 8.7 | 93.8 | 6.2 | F | 1719.2 | 7.1 | 76.0 | Example |
| 28 | 108 | 6.7 | 90.1 | 9.9 | F | 1746.0 | 6.6 | 70.0 | Example |
| 29 | 18 | 1.1 | 95.0 | 5.0 | F | 2099.0 | 6.1 | 52.0 | Comparative Example |
| 30 | 100 | 6.3 | 91.2 | 8.8 | F | 1252.6 | 10.2 | 86.3 | Example |
| 31 | 107 | 6.7 | 93.3 | 6.7 | F | 1261.5 | 11.5 | 88.3 | Example |
| 32 | 137 | 8.5 | 92.9 | 7.1 | F | 1259.3 | 11.4 | 91.8 | Example |
| 33 | 115 | 7.2 | 90.4 | 9.6 | F | 1663.4 | 9.2 | 75.0 | Example |
| 34 | 113 | 7.1 | 90.4 | 9.6 | F | 1892.1 | 8.0 | 74.2 | Example |
| 35 | 129 | 8.0 | 93.9 | 6.1 | F | 1278.4 | 10.9 | 87.8 | Example |
| 36 | 99 | 6.2 | 90.2 | 9.8 | F | 1250.0 | 11.2 | 88.6 | Example |

*F: Ferrite, M: Martensite

TABLE 4

| | Chemical composition | | | | | | | | | |
|---|---|---|---|---|---|---|---|---|---|---|
| Steel ID | C (mass %) | Si (mass %) | Mn (mass %) | P (mass %) | S (mass %) | Al (mass %) | N (mass %) | Others (mass %) | $Ac_1$ point (° C.) | $Ac_3$ point (° C.) | Remarks |
|---|---|---|---|---|---|---|---|---|---|---|---|
| XA | 0.252 | 0.189 | 1.65 | 0.0021 | 0.0011 | 0.032 | 0.0041 | Ni: 0.02 | 703 | 810 | Conforming steel |
| XB | 0.250 | 0.332 | 1.51 | 0.0017 | 0.0015 | 0.037 | 0.0036 | Cu: 0.01 | 708 | 817 | Conforming steel |
| XC | 0.254 | 0.292 | 1.47 | 0.0012 | 0.0019 | 0.036 | 0.0025 | Cr: 0.30 | 713 | 819 | Conforming steel |
| XD | 0.240 | 0.267 | 1.42 | 0.0017 | 0.0017 | 0.039 | 0.0035 | Mo: 0.32 | 711 | 817 | Conforming steel |
| XE | 0.240 | 0.209 | 1.38 | 0.0018 | 0.0025 | 0.033 | 0.0037 | Ti: 0.03 | 711 | 815 | Conforming steel |
| XF | 0.255 | 0.059 | 1.81 | 0.0013 | 0.0026 | 0.040 | 0.0045 | Nb: 0.02 | 697 | 803 | Conforming steel |
| XG | 0.254 | 0.198 | 1.55 | 0.0020 | 0.0034 | 0.029 | 0.0021 | V: 0.01 | 706 | 810 | Conforming steel |
| XH | 0.250 | 0.120 | 1.78 | 0.0017 | 0.0032 | 0.042 | 0.0027 | W: 0.03 | 699 | 807 | Conforming steel |
| XI | 0.266 | 0.078 | 1.53 | 0.0017 | 0.0031 | 0.036 | 0.0023 | Ti: 0.02 B: 0.002 | 705 | 803 | Conforming steel |
| XJ | 0.259 | 0.301 | 1.58 | 0.0012 | 0.0017 | 0.038 | 0.0033 | Ti: 0.02 B: 0.002 | 706 | 814 | Conforming steel |
| XK | 0.248 | 0.292 | 1.99 | 0.0016 | 0.0023 | 0.038 | 0.0027 | REM: 0.001 | 694 | 814 | Conforming steel |
| XL | 0.258 | 0.151 | 1.72 | 0.0014 | 0.0034 | 0.026 | 0.0030 | B: 0.0025 | 700 | 807 | Conforming steel |
| XM | 0.238 | 0.077 | 1.64 | 0.0018 | 0.0033 | 0.040 | 0.0050 | Ca: 0.003 | 702 | 808 | Conforming steel |
| XN | 0.267 | 0.276 | 1.26 | 0.0021 | 0.0012 | 0.040 | 0.0032 | Mg: 0.004 | 714 | 813 | Conforming steel |

TABLE 4-continued

| | Chemical composition | | | | | | | | | | |
|---|---|---|---|---|---|---|---|---|---|---|---|
| Steel ID | C (mass %) | Si (mass %) | Mn (mass %) | P (mass %) | S (mass %) | Al (mass %) | N (mass %) | Others (mass %) | Ac$_1$ point (° C.) | Ac$_3$ point (° C.) | Remarks |
| XO | 0.235 | 0.042 | 1.46 | 0.0015 | 0.0035 | 0.025 | 0.0049 | Sb: 0.010 | 707 | 808 | Conforming steel |
| XP | 0.221 | 1.23 | 2.30 | 0.0014 | 0.0021 | 0.035 | 0.0031 | Ti: 0.03 B: 0.002 | 697 | 861 | Conforming steel |
| XQ | 0.222 | 0.02 | 1.25 | 0.0050 | 0.0025 | 0.050 | 0.0030 | Ti: 0.03 B: 0.0025 Cr: 0.20 | 715 | 810 | Conforming steel |
| XR | 0.305 | 0.20 | 1.85 | 0.0012 | 0.0030 | 0.039 | 0.0049 | Ti: 0.03 Nb: 0.02 B: 0.002 | 697 | 799 | Conforming steel |
| XS | 0.323 | 0.25 | 1.24 | 0.0032 | 0.0041 | 0.034 | 0.0035 | Ti: 0.03 B: 0.0025 Sb: 0.009 | 714 | 801 | Conforming steel |
| XT | 0.372 | 0.24 | 1.26 | 0.0030 | 0.0042 | 0.037 | 0.0035 | Ti: 0.03 B: 0.0025 Sb: 0.01 | 712 | 792 | Conforming steel |

TABLE 5

| Steel sheet ID | Steel ID | Annealing conditions | | | Coating treatment |
|---|---|---|---|---|---|
| | | Dew point (° C.) | Heating temperature (° C.) | Retention time (min) | |
| XA1 | XA | 55 | 720 | 30 | None |
| XB1 | XB | 69 | 707 | 66 | Zn—Ni coating |
| XC1 | XC | 62 | 677 | 16 | None |
| XD1 | XD | 54 | 791 | 46 | Zn—Ni coating |
| XE1 | XE | 75 | 785 | 85 | None |
| XF1 | XF | 75 | 715 | 64 | Zn—Ni coating |
| XG1 | XG | 68 | 794 | 25 | None |
| XH1 | XH | 59 | 736 | 80 | Zn—Ni coating |
| XI1 | XI | 58 | 765 | 31 | None |
| XJ1 | XJ | 50 | 740 | 63 | Zn—Ni coating |
| XK1 | XK | 75 | 688 | 17 | None |
| XL1 | XL | 68 | 659 | 68 | Zn—Ni coating |
| XM1 | XM | 74 | 693 | 23 | None |
| XN1 | XN | 58 | 717 | 47 | Zn—Ni coating |
| XO1 | XO | 55 | 660 | 88 | None |
| XP1 | XP | 74 | 696 | 69 | Zn—Ni coating |
| XQ1 | XQ | 65 | 759 | 39 | Zn—Ni coating |
| XR1 | XR | 52 | 748 | 85 | Zn—Ni coating |
| XS1 | XS | 67 | 741 | 12 | Zn—Ni coating |
| XT1 | XT | 63 | 730 | 79 | Zn—Ni coating |

TABLE 6

| | | Microstructure of hot pressed part | | | | | | |
|---|---|---|---|---|---|---|---|---|
| | | Hot press conditions | | | Soft layer | | Residual | | | |
| Pressed part ID | Steel sheet ID | Heating temperature (° C.) | Retention time (sec) | Forming start temperature (° C.) | Ferrite volume fraction (%) | Ferrite grain size (μm) | Residual microstructure volume fraction (%) | Constituent phase of residual microstructure | Total thickness (μm) | Ratio of total thickness of soft layer to thickness of hot pressed part (%) |
| X1 | XA1 | 902 | 11 | 700 | 91.3 | 47.1 | 8.7 | M | 111 | 6.9 |
| X2 | XB1 | 876 | 12 | 705 | 90.0 | 34.8 | 10.0 | M | 156 | 9.7 |
| X3 | XC1 | 858 | 29 | 723 | 93.5 | 48.9 | 6.5 | M | 152 | 9.5 |
| X4 | XD1 | 912 | 16 | 724 | 90.1 | 29.3 | 9.9 | M | 102 | 6.4 |
| X5 | XE1 | 933 | 23 | 680 | 93.7 | 40.1 | 6.3 | M | 163 | 10.2 |
| X6 | XF1 | 921 | 26 | 717 | 91.2 | 24.6 | 8.8 | M | 157 | 9.8 |
| X7 | XG1 | 913 | 30 | 689 | 91.3 | 36.2 | 8.7 | M | 122 | 7.6 |
| X8 | XH1 | 870 | 11 | 724 | 90.4 | 17.4 | 9.6 | M | 160 | 10.0 |
| X9 | XI1 | 927 | 27 | 705 | 92.6 | 31.2 | 7.4 | M | 126 | 7.9 |
| X10 | XJ1 | 852 | 26 | 724 | 92.3 | 28.6 | 7.7 | M | 135 | 8.4 |
| X11 | XK1 | 922 | 18 | 709 | 93.8 | 4.7 | 6.2 | M | 127 | 8.0 |
| X12 | XL1 | 898 | 30 | 688 | 92.4 | 34.2 | 7.6 | M | 123 | 7.7 |
| X13 | XM1 | 918 | 12 | 725 | 93.0 | 11.2 | 7.0 | M | 152 | 9.5 |
| X14 | XN1 | 854 | 11 | 701 | 92.2 | 30.4 | 7.8 | M | 107 | 6.7 |
| X15 | XO1 | 936 | 12 | 705 | 91.7 | 16.6 | 8.3 | M | 143 | 8.9 |
| X16 | XP1 | 909 | 20 | 715 | 92.7 | 41.1 | 7.3 | M | 135 | 8.4 |
| X17 | XQ1 | 853 | 12 | 682 | 90.7 | 5.6 | 9.3 | M | 108 | 6.8 |
| X18 | XR1 | 948 | 28 | 711 | 93.6 | 19.2 | 6.4 | M | 96 | 6.0 |
| X19 | XS1 | 902 | 13 | 698 | 91.9 | 4.0 | 8.1 | M | 114 | 7.2 |
| X20 | XT1 | 928 | 19 | 729 | 91.1 | 47.9 | 8.9 | M | 102 | 6.4 |

TABLE 6-continued

| | | Microstructure of hot pressed part | | | | | | | |
|---|---|---|---|---|---|---|---|---|---|
| | | Transition layer | Hard layer | | | | | | |
| | | Ratio of total thickness of transition layer to thickness of hot pressed part (%) | Martensite volume fraction (%) | Residual microstructure volume fraction (%) | Constituent phase of residual microstructure | Mechanical properties of hot pressed part | | | |
| Pressed part ID | Total thickness (μm) | | | | | TS (MPa) | Total elongation (%) | Bending angle (°) | Remarks |
| X1 | 119 | 7.4 | 92.8 | 7.2 | F | 1377.2 | 10.2 | 80.2 | Example |
| X2 | 166 | 10.4 | 93.4 | 6.6 | F | 1264.3 | 11.0 | 87.4 | Example |
| X3 | 165 | 10.3 | 91.5 | 8.5 | F | 1283.6 | 11.6 | 86.1 | Example |
| X4 | 115 | 7.2 | 90.6 | 9.4 | F | 1354.8 | 9.5 | 81.6 | Example |
| X5 | 114 | 7.1 | 93.0 | 7.0 | F | 1266.0 | 11.8 | 87.3 | Example |
| X6 | 110 | 6.9 | 93.5 | 6.5 | F | 1324.5 | 9.9 | 83.4 | Example |
| X7 | 175 | 10.9 | 90.8 | 9.2 | F | 1320.4 | 11.1 | 83.7 | Example |
| X8 | 114 | 7.1 | 91.3 | 8.7 | F | 1302.7 | 9.7 | 84.8 | Example |
| X9 | 156 | 9.8 | 91.9 | 8.1 | F | 1364.7 | 11.0 | 81.0 | Example |
| X10 | 114 | 7.1 | 91.3 | 8.7 | F | 1365.1 | 10.1 | 80.9 | Example |
| X11 | 122 | 7.6 | 93.1 | 6.9 | F | 1338.6 | 9.7 | 82.5 | Example |
| X12 | 159 | 9.9 | 93.5 | 6.5 | F | 1342.2 | 9.6 | 82.3 | Example |
| X13 | 106 | 6.7 | 93.7 | 6.3 | F | 1284.5 | 10.4 | 86.0 | Example |
| X14 | 162 | 10.1 | 92.5 | 7.5 | F | 1390.5 | 9.6 | 79.5 | Example |
| X15 | 120 | 7.5 | 91.2 | 8.8 | F | 1276.5 | 9.9 | 86.6 | Example |
| X16 | 93 | 5.8 | 92.2 | 7.8 | F | 1263.3 | 10.4 | 89.5 | Example |
| X17 | 101 | 6.3 | 91.3 | 8.7 | F | 1297.8 | 10.4 | 80.9 | Example |
| X18 | 132 | 8.3 | 91.0 | 9.0 | F | 1557.0 | 7.9 | 73.0 | Example |
| X19 | 130 | 8.1 | 91.4 | 8.6 | F | 1681.7 | 8.8 | 71.5 | Example |
| X20 | 92 | 5.7 | 93.5 | 6.5 | F | 1816.4 | 7.7 | 71.0 | Example |

*F: Ferrite, M: Martensite

As seen from Tables 3 and 6, all Examples had high strength of 1100 MPa or more in tensile strength TS and excellent bendability of 70 degrees or more in bending angle. Comparative Examples, on the other hand, failed to satisfy at least one of the properties, i.e. strength and bendability.

The invention claimed is:

1. A hot pressed part comprising:
  a chemical composition containing, in mass %,
    C: 0.18% to 0.40%,
    Si: 0.01% to 2.0%,
    Mn: 0.5% to 2.5%,
    P: 0.05% or less,
    S: 0.05% or less,
    Al: 0.005% to 0.1%, and
    N: 0.01% or less,
  with a balance being Fe and inevitable impurities; and
  a steel microstructure in which, in a thickness direction of a top portion of a hat-shaped part of the hot pressed part, a surface layer is a soft layer, an inside is a hard layer, and a layer between the soft layer and the hard layer is a transition layer,
    wherein the soft layer includes ferrite of 90% or more in volume fraction with respect to the whole soft layer, an average grain size of the ferrite is 2 μm or more and 50 μm or less, and a total thickness of the soft layer calculated by summing a thickness of the soft layer formed at the front side of the hot pressed part and a thickness of the soft layer formed at the back side of the hot pressed part is 5% or more and 25% or less of a thickness of the hot pressed part,
    a total thickness of the transition layer calculated by summing a thickness of the transition layer formed at the front side of the hot pressed part and a thickness of the transition layer formed at the back side of the hot pressed part is 5% or more and 25% or less of the thickness of the hot pressed part, and
    the hard layer includes martensite of 90% or more in volume fraction with respect to the whole hard layer.

2. The hot pressed part according to claim 1, wherein the chemical composition further contains, in mass %, one or more groups selected from
  A group: one or more selected from Ni: 0.01% to 5.0%, Cu: 0.01% to 5.0%, Cr: 0.01% to 5.0%, and Mo: 0.01% to 3.0%,
  B group: one or more selected from Ti: 0.005% to 3.0%, Nb: 0.005% to 3.0%, V: 0.005% to 3.0%, and W: 0.005% to 3.0%,
  C group: one or more selected from REM: 0.0005% to 0.01%, Ca: 0.0005% to 0.01%, and Mg: 0.0005% to 0.01%,
  D group: Sb: 0.002% to 0.03%, and
  E group: B: 0.0005% to 0.05%.

3. The hot pressed part according to claim 2, comprising a coating layer on a surface thereof.

4. The hot pressed part according to claim 1, comprising a coating layer on a surface thereof, and
  the thickness of the hot pressed part does not include a thickness of the coating layer.

5. The hot pressed part according to claim 4, wherein the coating layer is a zinc-based coating layer or an aluminum-based coating layer.

6. The hot pressed part according to claim 5, wherein the zinc-based coating layer contains Ni: 10 mass % to 25 mass %.

7. A method of manufacturing a hot pressed part, the method comprising:

heating a slab and hot rolling the slab to obtain a hot-rolled steel sheet, the slab having a chemical composition containing, in mass %, C: 0.18% to 0.40%,
Si: 0.01% to 2.0%,
Mn: 0.5% to 2.5%,
P: 0.05% or less,
S: 0.05% or less,
Al: 0.005% to 0.1%, and
N: 0.01% or less,
with a balance being Fe and inevitable impurities;
cold rolling the hot-rolled steel sheet to obtain a cold-rolled steel sheet;
annealing by heating the cold-rolled steel sheet to a temperature range of $Ac_1$-50° C. or more and less than $Ac_3$ point in an atmosphere of a dew point of 50° C. or more and 90° C. or less, thereafter retaining the cold-rolled steel sheet in the atmosphere and in the temperature range for 5 min or more and 90 min or less, and thereafter cooling the cold-rolled steel sheet, to obtain a steel sheet for hot press; and
heating the steel sheet for hot press to a temperature range of $Ac_3$ point or more and 1000° C. or less, retaining the steel sheet for hot press in the temperature range for 10 sec or more and 900 sec or less, and thereafter press forming and simultaneously quenching the steel sheet for hot press using a tool of press forming with a forming start temperature of $Ac_3$ point-50° C. or less and 600° C. or more, to obtain a hot pressed part having the steel microstructure according to claim 1.

8. The method of manufacturing a hot pressed part according to claim 7, wherein the chemical composition further contains, in mass %, one or more groups selected from A group: one or more selected from Ni: 0.01% to 5.0%, Cu: 0.01% to 5.0%, Cr: 0.01% to 5.0%, and Mo: 0.01% to 3.0%, B group: one or more selected from Ti: 0.005% to 3.0%, Nb: 0.005% to 3.0%, V: 0.005% to 3.0%, and W: 0.005% to 3.0%, C group: one or more selected from REM: 0.0005% to 0.01%, Ca: 0.0005% to 0.01%, and Mg: 0.0005% to 0.01%, D group: Sb: 0.002% to 0.03%, and E group: B: 0.0005% to 0.05%.

9. The method of manufacturing a hot pressed part according to claim 8, further comprising
forming a coating layer on a surface of the steel sheet for hot press, after the annealing.

10. The method of manufacturing a hot pressed part according to claim 9, wherein a coating weight of the coating layer is 10 $g/m^2$ to 90 $g/m^2$ per one side.

11. The method of manufacturing a hot pressed part according to claim 7, further comprising
forming a coating layer on a surface of the steel sheet for hot press, after the annealing.

12. The method of manufacturing a hot pressed part according to claim 11, wherein the coating layer is a zinc-based coating layer or an aluminum-based coating layer.

13. The method of manufacturing a hot pressed part according to claim 12, wherein a coating weight of the coating layer is 10 $g/m^2$ to 90 $g/m^2$ per one side.

14. The method of manufacturing a hot pressed part according to claim 12, wherein the zinc-based coating layer contains Ni: 10 mass % to 25 mass %.

15. The method of manufacturing a hot pressed part according to claim 14, wherein a coating weight of the coating layer is 10 $g/m^2$ to 90 $g/m^2$ per one side.

16. The method of manufacturing a hot pressed part according to claim 11, wherein a coating weight of the coating layer is 10 $g/m^2$ to 90 $g/m^2$ per one side.

* * * * *